(12) United States Patent
Togashi et al.

(10) Patent No.: US 7,019,808 B2
(45) Date of Patent: Mar. 28, 2006

(54) IMAGE DEVICE

(75) Inventors: Seigo Togashi, Sakado (JP); Terutaka Okano, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/956,097

(22) Filed: Sep. 20, 2001

(65) Prior Publication Data
US 2002/0044251 A1   Apr. 18, 2002

(30) Foreign Application Priority Data
Sep. 21, 2000   (JP) .............................. 2000-286808

(51) Int. Cl.
*G02F 1/1345*   (2006.01)

(52) U.S. Cl. ..................... 349/149; 349/150

(58) Field of Classification Search ........ 349/149–152, 349/143, 158
See application file for complete search history.

(56) References Cited

U.S. PATENT DOCUMENTS

| | | | |
|---|---|---|---|
| 4,687,300 A * | 8/1987 | Kubo et al. ................ | 349/151 |
| 5,467,210 A * | 11/1995 | Kishigami .................. | 359/88 |
| 6,011,605 A * | 1/2000 | Mizuno et al. ............ | 349/113 |
| 6,128,063 A * | 10/2000 | Uchiyama et al. .......... | 349/150 |
| 6,456,353 B1 * | 9/2002 | Chen ........................ | 349/150 |

FOREIGN PATENT DOCUMENTS

| | | |
|---|---|---|
| JP | 63-184781 | 7/1988 |
| JP | 2-69720 | 3/1990 |
| JP | 6-67195 | 3/1994 |

* cited by examiner

*Primary Examiner*—Dung T. Nguyen
*Assistant Examiner*—Thoi V. Duong
(74) *Attorney, Agent, or Firm*—Finnegan, Henderson, Farabow, Garrett & Dunner, L.L.P.

(57) ABSTRACT

In an image device according to the invention, one end of a panel having a pixel section is extended and an external connection board connected to the extended portion, and first and second integrated circuits, each containing a driving circuit for the panel, are mounted on at least either the extended portion or the external connection board and are arranged one behind the other along a direction directed from the external connection board toward the panel. Input wiring lines for the second integrated circuit mounted nearer to the panel are passed under the first integrated circuit mounted farther from the panel, and are then connected to the second integrated circuit. Alternatively, output wiring lines from the first integrated circuit mounted farther from the panel are routed into the panel by being passed under the integrated circuit mounted nearer to the panel. This serves to greatly reduce the top plan size of the image device because the panel driving integrated circuits and the external connection board can be arranged collectively on one side of the panel.

14 Claims, 16 Drawing Sheets

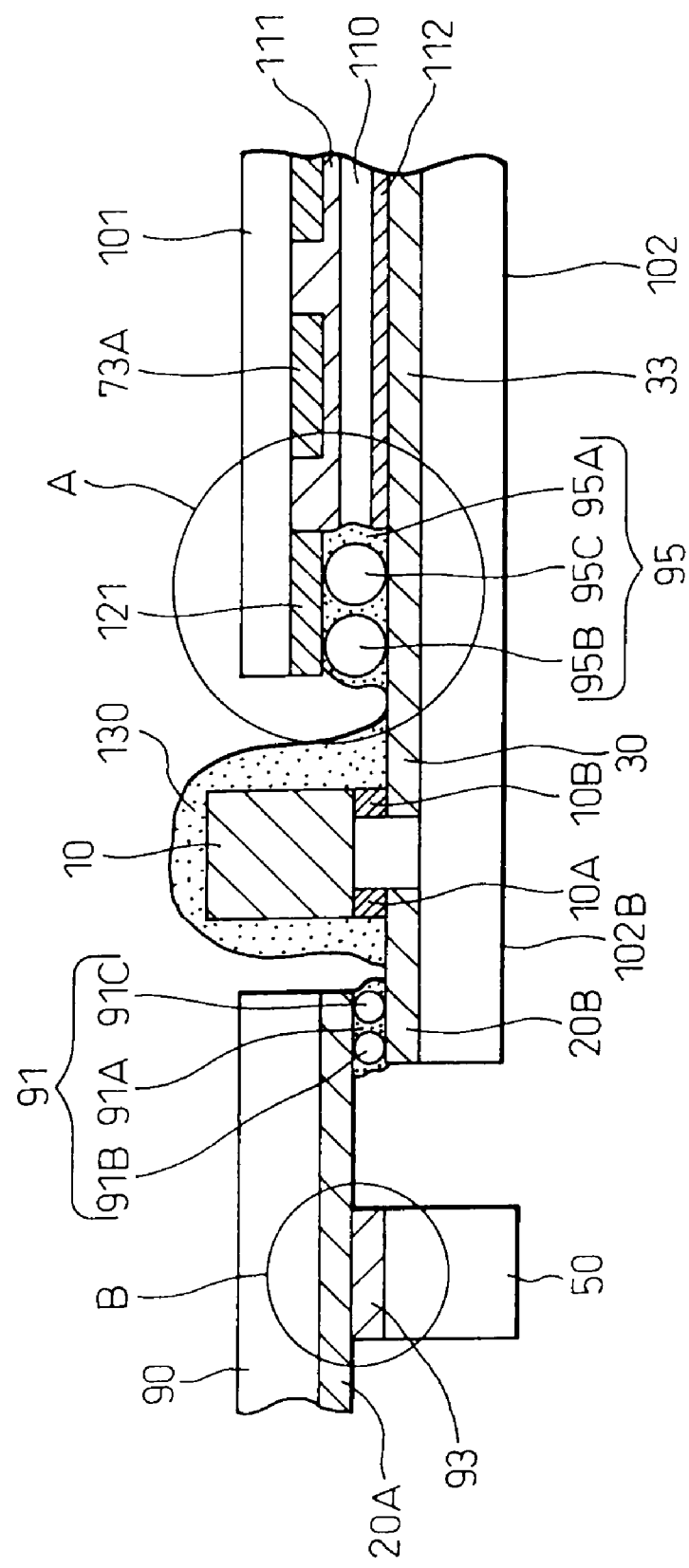

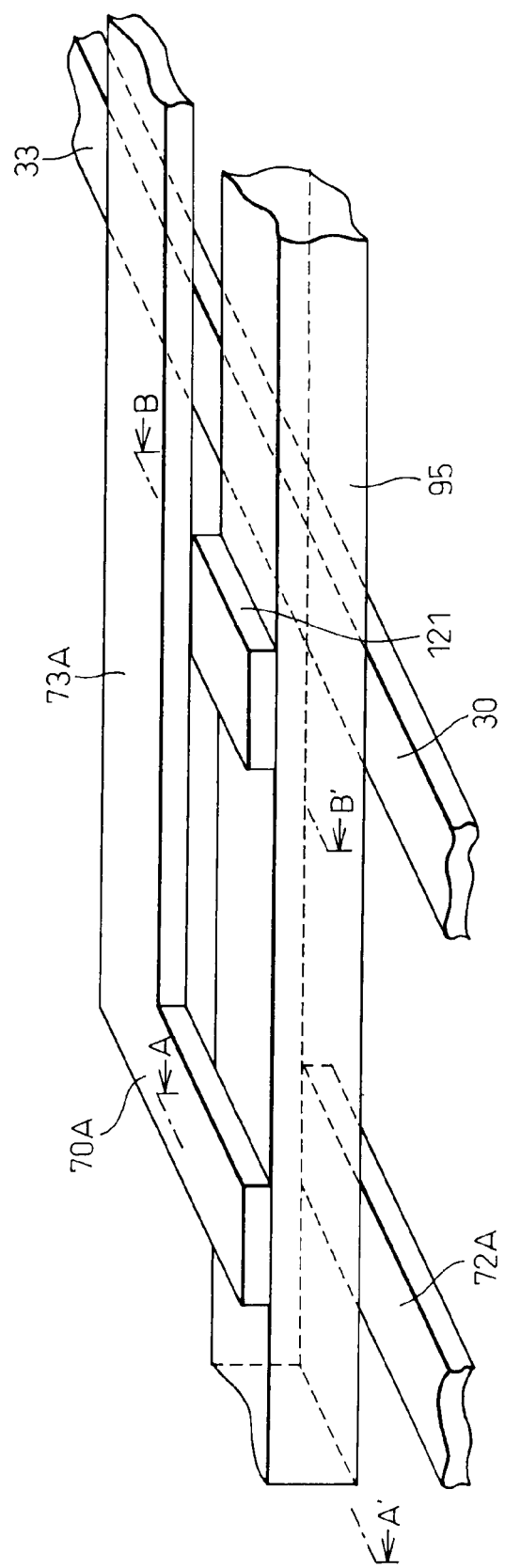

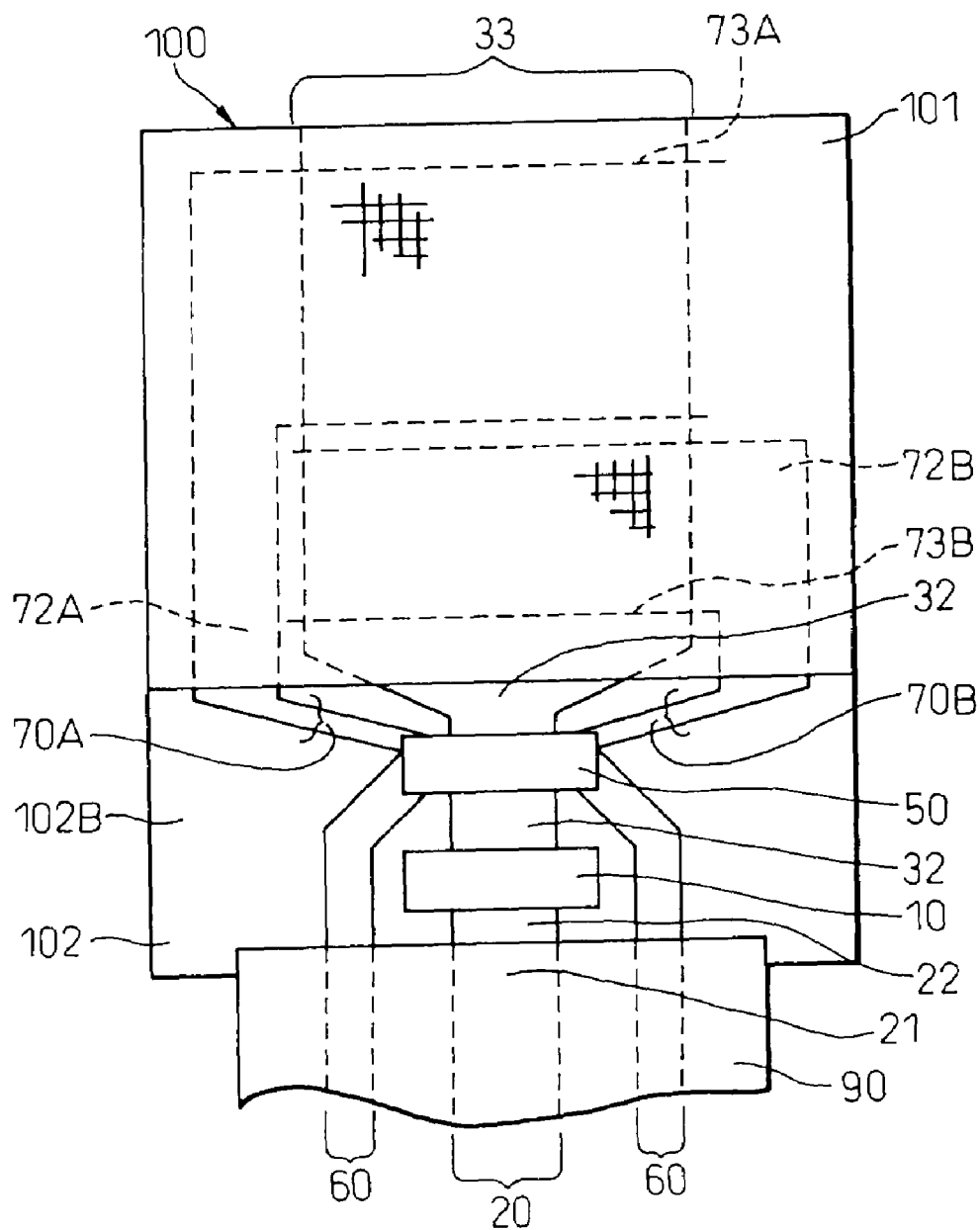

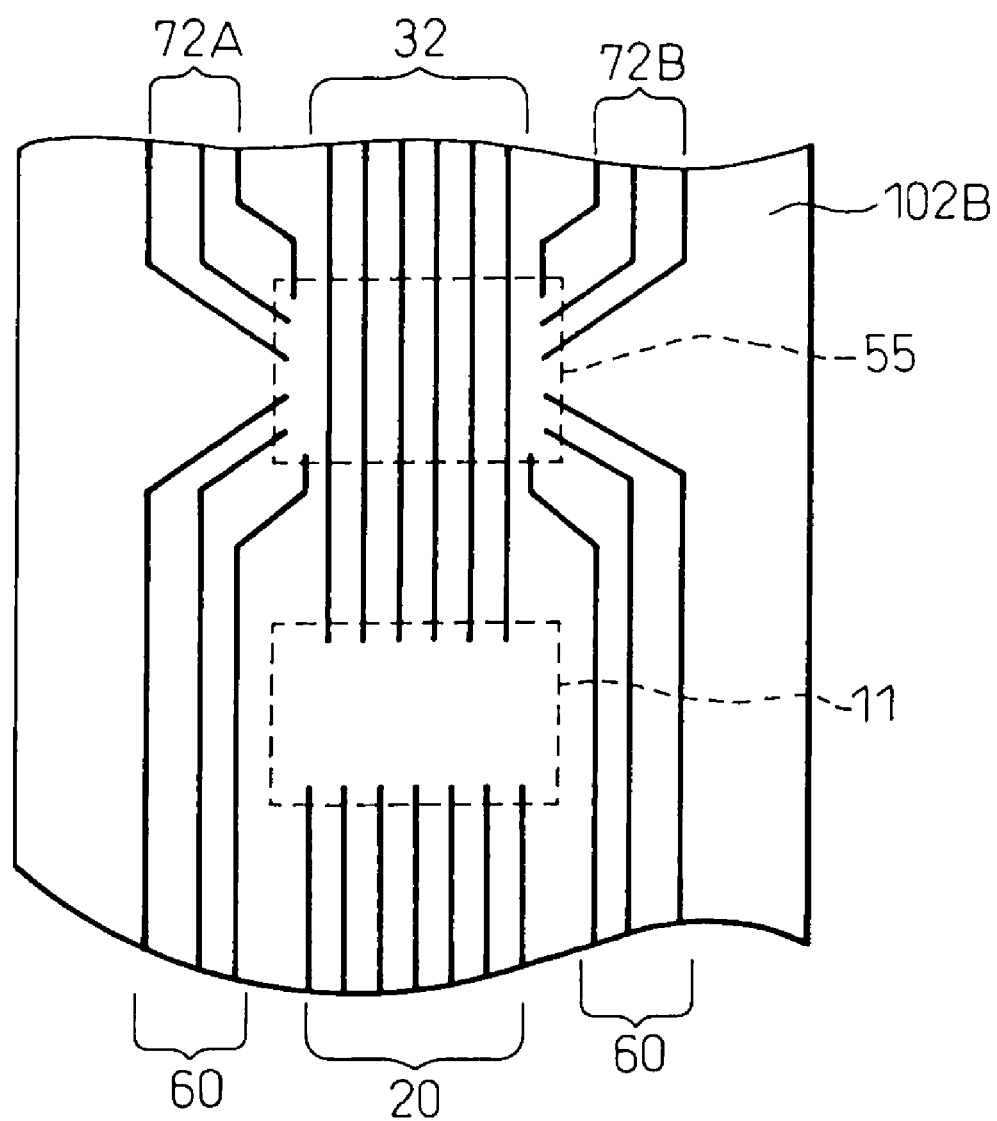

IMAGE DEVICE

BACKGROUND OF THE INVENTION

1. Field of the Invention

The present invention relates to an image device comprising a panel having a pixel section, and more particularly to an image device comprising integrated circuits for supplying driving signals to the pixel section and an external connection board for supplying control signals to the integrated circuits.

2. Description of the Related Art

Image devices suitable for compact and thin construction have been strongly demanded for display devices used in portable personal computers, information apparatuses such as portable TVs, and terminal apparatuses such as portable telephones, or for printing devices such as those used in printers using liquid crystal shutters or in photographic printers (for example, photo printers) or the like. Liquid crystal displays, liquid crystal printers, etc. that use liquid crystals can meet such market needs.

Under these circumstances, liquid crystal devices are commonly used as image devices. In recent years, there has developed a need to increase the image resolution of such liquid crystal devices so that more image information can be handled while retaining the compact size of the device. That is, there has arisen a need to increase the number of wiring lines in the liquid crystal panel constituting the liquid crystal device, while making the entire construction of the liquid crystal device, including its drive circuitry, thin and compact in size. Responding to such needs, many inventions have been proposed, which include, for example, an image device equipped with drive circuits or control circuits mounted using a COG (chip-on-glass) technique which mounts driver ICs directly on the substrate of the liquid crystal panel constituting the liquid crystal device, and an image device in which a flexible or rigid board with drive circuits or control circuits mounted thereon is connected to the liquid crystal panel constituting the liquid crystal device.

Of the prior art image devices, the image device equipped with drive circuits mounted using the COG (chip-on-glass) technique which mounts driver ICs directly on the substrate of the liquid crystal panel constituting the liquid crystal device will be described below, as an example, by referring to an invention previously proposed by the Applicant and disclosed in Japanese Patent Application No. 2000-176257.

FIG. 11 is a diagram showing the structure of an essential portion of a liquid crystal display device, as prior art 1, in which driver ICs are mounted using the COG technique described above. FIG. 11(A) is a front view, and FIG. 11(B) is a top plan view. In FIGS. 11(A) and 11(B), reference numeral 201 is a top glass substrate, 202 is a bottom glass substrate, 203 is a segment electrode driver IC, and 204 is a common electrode driver IC. Further, reference numerals 205 and 205B indicate segment electrodes and segment electrode leads, respectively, formed on the lower surface of the top glass substrate 201. Reference numerals 206 and 206B indicate common electrodes and common electrode leads, respectively, formed on the upper surface of the bottom glass substrate 202. The top glass substrate 201 and the bottom glass substrate 202 are overlaid one on top of the other and bonded together via a sealing member 207 made of an insulating adhesive material, leaving their extended portions 201B and 202B extending in the vertical and horizontal directions, respectively, as shown in the figure. A liquid crystal cell is thus constructed.

The sealing member (sealing material) 207 is formed in such a manner as to encircle the periphery of the overlaid area, leaving an injection port opened (not shown) and thus forming a sealed space for a liquid crystal. The top glass 201 and the bottom glass 202 hold therebetween the liquid crystal (not shown) injected into the sealed space, and thus form a display area 208. In the display area 208, the plurality of segment electrodes 205 formed on the lower surface of the top glass substrate 201 and the plurality of common electrodes 206 formed on the upper surface of the bottom glass substrate 202 are arranged intersecting each other, forming a matrix array of a plurality of pixels 209 and thus forming a pixel section. (By applying a prescribed voltage between the segment electrode 209 205 and common electrode 206 corresponding to each target pixel by a known method, a desired character, graphic, etc. can be displayed).

The segment electrode leads 205B and input wiring lines 210 for the segment electrode driver IC are formed on the lower surface of the extended portion 201 B of the top glass substrate 201. The common electrode leads 206B and input wiring lines 211 for the common electrode driver IC are formed on the upper surface of the extended portion 202B of the upper glass substrate 202. An array of protruding connection terminals 203B not shown is provided on the bottom of the segment electrode driver IC 203, and the segment electrode driver IC 203 is mounted using the COG technique via an anisotropic conductive film not shown, with its connecting terminals 203B connected to the segment electrode leads 205B and the input wiring lines 210 for the segment electrode driver IC. Likewise, a similar connection terminal array 204B is provided on the bottom of the common electrode driver IC 204, and the common electrode driver IC 204 is also mounted in the same manner as described above, with its connecting terminals 204B connected to the common electrode leads 206B and the input wiring lines 211 for the common electrode driver IC.

The input wiring lines 210 for the segment electrode driver IC and the input wiring lines 211 for the common electrode driver IC are each connected to an external circuit via a flexible printed circuit (FPC) not shown.

In the above structure, when a segment electrode driving signal is applied from the external circuit to the segment electrode driver IC 203 via the FPC through the input wiring lines 210 for the segment electrode driver IC, the segment electrode driver IC 203 generates a segment electrode driving voltage, and the driving voltage is applied to each segment electrode 205 via the corresponding segment electrode lead 205B. Likewise, when a common electrode driving signal is applied from the external circuit to the common electrode driver IC 204 via the corresponding FPC through the input wiring lines 211 for the common electrode driver IC, the common electrode driver IC 204 generates a common electrode driving voltage, and the driving voltage is applied to each common electrode 206 via the corresponding common electrode lead 206B. As a result, a prescribed voltage corresponding to the driving signals is applied to the liquid crystal at each pixel 209 in the display area 208, producing the desired display by controlling the light transmittance of the liquid crystal.

In this way, the liquid crystal display device shown in FIG. 11 is thin in construction and is capable of producing the necessary display. However, in this liquid crystal display device, the extended portions 201B and 202B extending in the vertical and horizontal directions from the display area must be provided in order to mount the driver ICs thereon. As a result, the liquid crystal panel, when viewed from the top, is not rectangular in shape, but has a complex top plan shape that is asymmetric between left and right.

Generally, for a liquid crystal display device, a housing having a simple top plan shape such as a rectangular shape is used for the convenience of use and for aesthetic appearance; as a result, the above prior art liquid crystal display device has the problem that the object of reducing the size cannot be achieved because the top plan dimensions of the construction, including the housing, become substantially large compared with the display area 208.

It is known to provide a liquid crystal display device of the structure shown in FIG. 12 as prior art 2 that resolves the problem associated with the asymmetric shape shown in FIG. 11. In FIG. 12, reference numeral 221 is the top glass substrate, and 222 is the bottom glass substrate. The top glass substrate 221 and the bottom glass substrate 222 have the same horizontal width, and substantially the same vertical length. The top glass substrate 221 and the bottom glass substrate 222 are not displaced horizontally, but displaced vertically relative to each other in opposite directions, and are bonded together via the sealing member 207, leaving their extended portions 221B and 222B exposed as shown in the figure. On the lower surface of the top glass substrate 221 are formed the segment electrodes 205, the segment electrode leads 205B which are extensions of the segment electrodes, and the input wiring lines 210 provided independently of the segment electrode leads.

Here, the input wiring lines 210 are formed near the vertical edge of the extended portion 221B of the top glass substrate, and the segment electrode leads 205B are formed extending from the extended portion 221B to the sealed area 228 enclosed by the sealing member 207, while the segment electrodes 205 are formed within the sealed area 228.

Indicated at 206C are common electrode routing lines connecting between the common electrodes 206 and the common electrode leads 206B in integral fashion. The common electrodes 206, the common electrode routing lines 206C, the common electrode leads 205B, and the input wiring lines 211 provided independently of the common electrode leads are formed on the upper surface of the bottom glass substrate 221.

Here, the input wiring lines 211 are formed near the vertical edge of the extended portion 222B of the bottom glass substrate, and the common electrode leads 206B are formed extending from the extended portion 222B to the sealed area 228 enclosed by the sealing member 207, while the common electrodes 206 and the common electrode routing lines 206C are formed within the sealed area 228.

In the sealed area 228, the common electrodes 206 and the segment electrodes 205 are arranged intersecting each other, forming a matrix array of pixels 209 from their intersections. The common electrode routing lines 206C are formed in routing areas 230A and 230B in the sealed area 228 on the left and right sides of the display area 228 comprising the pixels 209. When the number of common electrodes 206 is 4n, for example, the number of common electrode routing lines in each of the left and right routing areas 230A and 230B is 2n. In a manner similar to that already described, the input wiring lines 210 and the segment electrode leads 205B are connected to the segment electrode driver IC 203, and the input wiring lines 211 and the common electrode leads 206B are connected to the common electrode driver IC 204.

In the above structure, when prescribed driving signals are applied from the outside to the segment electrode driver IC 203 and the common electrode driver IC 204 through the respective input wiring lines 210 and 211 in a manner similar to that previously described, the light transmittance of each pixel 209 in the display area 229 is controlled based on substantially the same principle as previously described, and the desired display is produced. As shown in FIG. 12, in the prior art 2, the liquid crystal panel is symmetrical between left and right, and the space efficiency of the housing is better than that of the liquid crystal panel shown in FIG. 11.

In the prior art 2, since the top plan shape of the liquid crystal panel comprising the top glass substrate 221 and bottom glass substrate 222 bonded together via the sealing member 207 is substantially rectangular, the liquid crystal panel can be accommodated efficiently utilizing the space within a housing whose top plan shape is rectangular; however, since the width is extended left and right as shown in FIG. 12, the prior art 2 has not been effective in achieving a sufficient size reduction. This has been particularly true in the case of portable telephones that have recently become ubiquitous in the market.

In view of this, a method has been devised that integrates the common electrode driving circuit and the segment driving circuit into a single integrated circuit. With this method, the segment driver IC 203 and the common electrode driver IC in FIG. 12 can be combined into one IC. In fact, products using such an IC have been around in recent years.

It will, however, be noted that while each common electrode is selected and driven once in each frame or field period, in the same field or frame period each segment electrode is supplied with substantially as many pulses as there are segment electrodes. For example, in the case of a liquid crystal panel having 128 segment electrodes, up to the 128 segment electrodes are selected during one common electrode selection period.

In this way, the number of pulses that the segment driving circuit applies to each segment electrode is larger than the number of pulses that the common electrode driving circuit applies to each common electrode, and as a result, if the operating voltage of the segment driving circuit is increased, current consumption increases, increasing the power consumption and hence the switching noise; therefore, usually use is made of a means that reduces the operating voltage of the segment driving circuit and relatively increases the operating voltage of the common electrodes.

One possible method is to integrate the common electrode driving circuit and segment driving circuit with different supply voltages or driving circuits with different operating voltages into a single integrated circuit or IC, but in that case, the fabrication of the integrated circuit becomes difficult because of noise, power consumption, and the complexity of the fabrication process, leading to the problem of increased IC cost. Furthermore, since the number of input terminals and output terminals on the integrated circuit increases, it is difficult to arrange the terminals within the limited surface area of the integrated circuit, and besides, highly precise positioning of the integrated circuit becomes necessary, resulting in the problem of increased production cost. Further, if the integrated circuit is rendered defective during the production process, etc., the expensive integrated circuit has to be discarded as a matter of course, leading to the problem that the cost associated with such losses increases.

Besides the above method using the COG, the method disclosed in Japanese Unexamined Publication No. 63-184781 and described below as prior art 3 has also been used as a method for supplying driving signals to the liquid crystal panel. In this method, electrode driver ICs are mounted on FPCs each of which is connected at one end to the liquid crystal panel by an anisotropic conductive adhesive material or the like.

The prior art 3 related to the present invention will be described with reference to FIG. 13 taken from Japanese Unexamined Publication No. 63-184781. In FIG. 13, the liquid crystal device 230 comprises a glass substrate on which common electrodes are formed, a glass substrate on which a plurality of segment electrodes are formed, and a liquid crystal sandwiched between the two glass substrates, thus forming a liquid crystal display area 215. Lead electrodes for the common electrodes and segment electrodes are formed on the four sides of one glass substrate. Circuit boards 232 constructed from FPCs with X-driver IC chips 216, Y-driver IC chips 217, and a control IC chip 218 mounted thereon are provided on the four sides of the glass substrate, and the lead electrodes on each circuit board 232 are connected at a connection part 219 to the corresponding lead electrodes on the liquid crystal panel 231 by using an anisotropic conductive adhesive material.

To connect the lead electrodes by an anisotropic conductive adhesive material, the anisotropic conductive adhesive material, which is prepared by mixing conductive particles and nonconductive particles in a thermoplastic resin binder, is applied between the electrodes which are then connected and bonded together under heat and pressure.

Since the electrode driver ICs are mounted on the FPCs, the prior art 3 has advantages over other prior art in that a defective electrode driver IC is easily replaceable, and in that there is no need to provided within the liquid crystal panel the electrode driver IC mounting space for mounting the driver ICs using the COG technique. However, in the liquid crystal device of the prior art 3, to connect the outputs of the driver ICs to the liquid crystal panel, extended portions are provided in the vertical and horizontal directions of the display area and connected at at least two places to the FPCs, one for common electrode driving and the other for segment electrode driving. The resulting problem is that the top plan size of the liquid crystal device becomes large.

Generally, for a liquid crystal display device, a housing having a simple top plan shape such as a rectangular shape is used for the convenience of use and for aesthetic appearance; as a result, the above prior art liquid crystal display device has the problem that the object of reducing the size cannot be achieved because the top plan dimensions of the construction, including the housing, become substantially large compared with the display (pixel) area 215.

The arrangement of wiring lines on an FPC that are connected to the input or output terminals of an electrode driver IC when mounting the electrode driver IC on the FPC in the prior art 3 will be described below as prior art 4 with reference to Japanese Unexamined Patent Publication No. 2-69720.

FIG. 14 shows a wiring pattern on the substrate side of an electrode driver IC mounting area in a color liquid crystal panel, in which reference numeral 241 indicates the wiring lines on the input side and 242 the wiring lines on the output side. An input signal is input through the input wiring lines 241 into the electrode driver IC mounted on the electrode driver IC mounting area 243, the area enclosed by dashed lines in the figure, and the signal is processed by the electrode driver IC and output as a driving signal through the output wiring lines 242. The thus output driving signal is used to drive the liquid crystal. Substantially the same wiring pattern is used for the substrate side wiring pattern in COG mounting.

SUMMARY OF THE INVENTION

As described above, since the liquid crystal panel usually uses a housing having a simple top plan shape such as a rectangular shape for the convenience of use and for aesthetic appearance, the prior art image device has the problem that the object of reducing the size cannot be achieved because the top plan dimensions of the construction, including the housing, become substantially large compared with the display area.

Furthermore, if the integrated circuit is rendered defective during the production process, etc., the expensive integrated circuit has to be discarded as a matter of course, leading to the problem that the cost associated with such loss increases.

The present invention has been devised to solve the problems of the prior art image device, and an object of the invention is to provide an image device that is low cost and is small in top plan size.

According to the present invention, to solve the above-outlined problems, one end of a panel having a pixel section is extended and an external connection board connected to the extended portion, and first and second integrated circuits, each containing a driving circuit for the panel, are mounted on at least either the extended portion or the external connection board and are arranged one behind the other along a direction directed from the external connection board toward the panel. Input wiring lines for the second integrated circuit mounted nearer to the panel are passed under the first integrated circuit mounted farther from the panel, and are then connected to the second integrated circuit. Alternatively, output wiring lines from the first integrated circuit mounted farther from the panel are routed into the panel by being passed under the integrated circuit mounted nearer to the panel.

In this way, in the image device of the present invention, as the first and second integrated circuits are arranged one behind the other along the direction directed from the external connection board to the panel, and the wiring lines for one of the first and second integrated circuits are formed by being passed under the other one of the integrated circuits, the integrated circuits and their wiring lines can be arranged collectively on one side of the panel. This serves to greatly reduce the top plan size of the image device, achieving compact image device construction.

Here, the integrated circuits need not necessarily be arranged parallel to each other with respect to the one side of the panel, but may be arranged at a certain angle to the one side of the panel or may be displaced relative to each other parallel to the one side of the panel.

Further, the number of integrated circuits to be mounted on at least either the panel extended portion or the external connection board need not be limited to two, but three or more integrated circuits may be mounted. Moreover, if necessary, another end of the panel may be extended and an external connection board connected to the extended portion, and the first and second integrated circuits may be mounted and arranged thereon in the same manner as earlier described.

The panel may be, for example, a liquid crystal panel, an EL panel, or a plasma display panel. Of course, the panel may be of the type that displays images, or both images and characters, or only characters. Further, the panel is not limited to the type that by itself displays an image, but may be constructed, for example, as a shutter for a printer.

The external connection board may be an FPC or a rigid board. The first and second integrated circuits are a common electrode driver IC and a segment electrode driver IC for driving the panel. Both of them may be mounted on the extended portion of the panel, or one of them may be mounted on the panel extended portion and the other on the external connection board; alternatively, both of them may be mounted on the external connection board.

BRIEF DESCRIPTION OF THE DRAWINGS

Embodiments of the present invention will be described with reference to the accompanying drawings, wherein:

FIG. 2A is a cross-sectional view taken along line Y–Y' in FIG. 1;

FIG. 2B is a perspective view of an essential portion for explaining the wiring structure in portion A in FIG. 2A;

FIG. 9 is a plan view showing an essential portion of an image device according to a fifth embodiment of the present invention;

FIG. 10 is a diagram showing a wiring pattern on a bottom glass substrate in the image device shown in FIG. 9;

DESCRIPTION OF THE PREFERRED EMBODIMENTS

The preferred embodiments of the present invention will be described below with reference to the accompanying drawings. Each of the embodiments described hereinafter deals with the configuration in which two integrated circuits (ICs) are arranged in a line, but it will be appreciated that the invention can be applied and the same effect obtained if the number of ICs so arranged is increased to more than two. Further, the ICs need not necessarily be arranged in a straight line, but may be displaced in directions parallel to each other or may be arranged at a certain angle relative to each other, not strictly parallel to each other. However, arranging them in a straight line, that is, aligning them one behind the other, has the advantage of making the routing of wiring lines less complex.

In each of the embodiments of the invention described hereinafter, the panel of the image device is constructed from a liquid crystal panel. As is well known, the liquid crystal panel is constructed by suitably combining glass or plastic substrates, a sealing member, a reflective film, a black matrix, electrodes, color filters, an insulating film, a planarization film, an alignment film, etc. according to the product specification of the panel. For simplicity of explanation, each embodiment of the invention described herein deals with the case where the liquid crystal panel is constructed from the simplest set of members. It will, however, be appreciated that the present invention is not limited to the specific liquid crystal panel shown in each embodiment, but is also applicable to image devices constructed from other components than the liquid crystal panel, for example, image devices constructed from light-emitting diode arrays.

A first embodiment of the invention will be described with reference to FIG. 1 and FIGS. 2A to 2G. This embodiment shows the configuration in which the segment electrode driver IC chip is mounted on one of the glass substrates constituting the liquid crystal panel, while the common electrode driver IC chip is mounted on a flexible circuit board.

Figure 1:
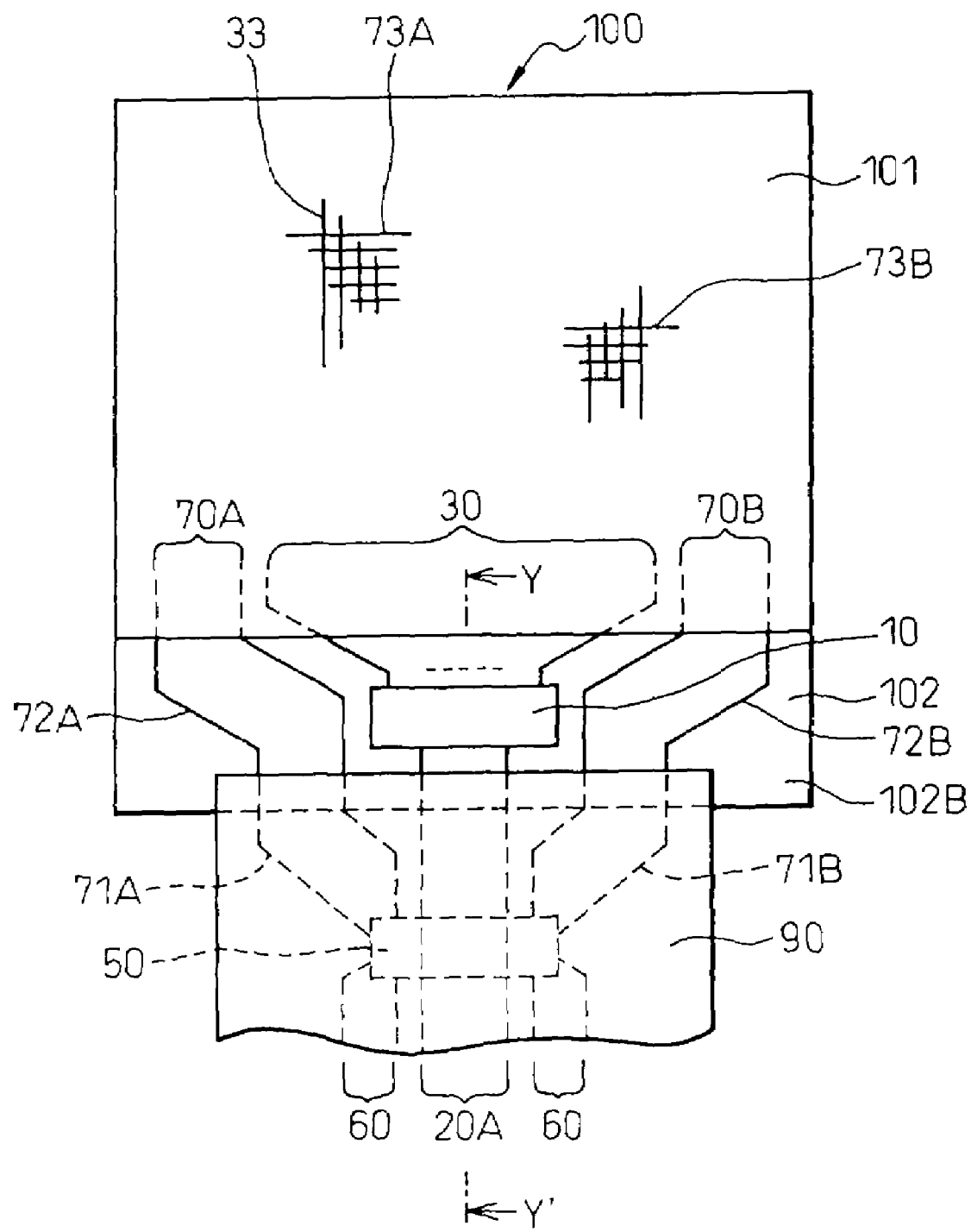
FIG. 1 is a plan view showing an essential portion, especially a panel portion, of an image device according to a first embodiment of the present invention.
Figure 2C:
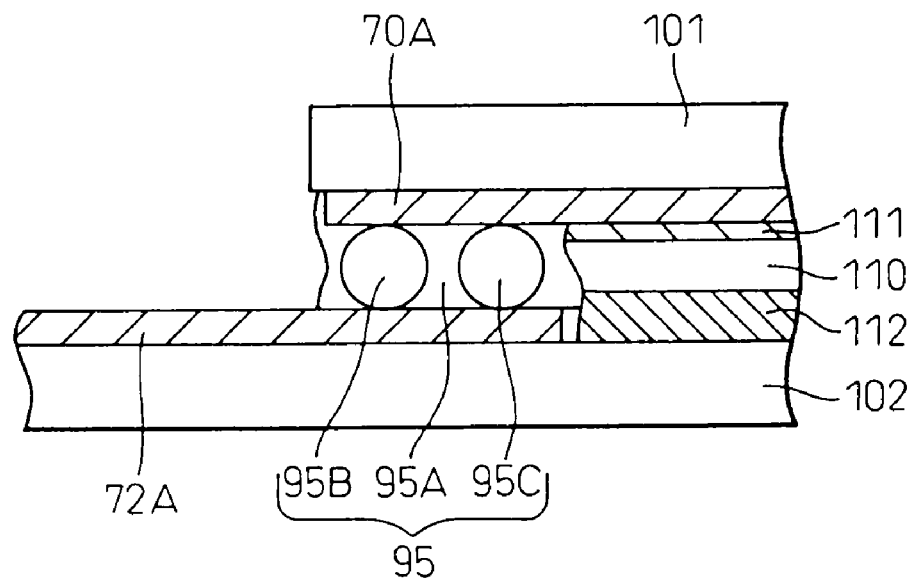
FIG. 2C is a cross-sectional view taken along line A–A' in FIG. 2B.

In FIG. 1 and FIGS. 2A to 2G, reference numeral 101 is the top glass substrate, and 102 is the bottom glass substrate; these substrates are arranged with their electrode (wiring) surfaces facing each other, and the liquid crystal panel 100 is constructed by filling a liquid crystal 110 between the substrates. In FIG. 2A, reference numeral 111 is a top alignment film formed covering the pixel electrodes on the top glass substrate 101, and 112 is a bottom alignment film formed on the bottom glass substrate 102.

Further, reference numeral 10 is the segment electrode driver IC chip (hereinafter called the SGDIC) which is mounted on an extended portion 102B of the bottom glass substrate 102, 20B is input wiring for the SGDIC 10, and 30 is output wiring for the same. The output wiring 30 is routed into the pixel section, forming wiring lines 33 which constitute the segment electrodes.

In FIG. 2A, reference numeral 130 is a mold material for forming a mold covering the SGDIC 10, and is usually made of a resin. Reference numerals 10A and 10B are connection terminals provided on the IC chip.

The flexible printed board (hereinafter called the FPC—Flexible Printed Circuit) as an external connection board is connected by an adhesive to the extended portion 102B of the bottom glass substrate 102. Reference numeral 50 is the common electrode driver IC chip (hereinafter called the COMIC) which is mounted on the FPC 90. As shown, in this embodiment, the COMIC 50 is mounted on the FPC 90 in such a manner as to be substantially parallel to the SGDIC 10 mounted on the extended portion 102B of the bottom glass substrate 102. Reference numeral 60 is input wiring for the COMIC 50, and 71A and 71B are output wiring for the same.

Further, in this embodiment, input wiring 20A for the SGDIC 10 is printed on the FPC 90, as shown in FIG. 2A; this input wiring 20A is passed under the COMIC 50 and is connected via the connection part between the FPC 90 and the bottom glass substrate 102 to the input wiring 20B for the SGDIC 10. The structure of the input wiring for the SGDIC 10 will be described later.

Next, the structures of the connection part between the top and bottom glass substrates, the connection part between the bottom glass substrate and the FPC, and the mounting part for mounting the COMIC 50 will be described.

First, the connection part between the top and bottom glass substrates will be described. As shown in FIG. 2A, the top glass substrate 101 and the bottom glass substrate 102 are overlaid one on top of the other with a sealing member 95 placed therebetween, and the liquid crystal 110 is filled into the gap between them. The sealing member 95 is provided with an injection hole through which the liquid crystal 110 is injected. The sealing member 95 is prepared by mixing conductive particles 95B and nonconductive particles 95C in an insulating adhesive material (binder) 95A. The conductive particles 95B provide the sealing member with electrical conductivity in the thickness direction of the panel, while the nonconductive particles 95C serve to prevent the conductive particles 95B from connecting like a chain and shorting in directions parallel to the substrates. With the presence of these particles, the sealing member 95 exhibits electrical conductivity anisotropy in the direction perpendicular to the substrates. The nonconductive particles 95C also function as spacers between the top and bottom glass substrates.

Because of this electrical conductivity anisotropy of the sealing member 95, output routing wiring lines 72A and 73B for the COMIC 50, which are formed on the extended portion 102B of the bottom glass substrate 102, are connected via the sealing member 95 to output wiring lines 70A and 70B for the COMIC 50, which are formed on the top glass substrate 101. As a result, the output wiring lines from the COMIC 50, formed on the bottom glass substrate 102, are transferred to the top glass substrate 101.

Figure 2D:
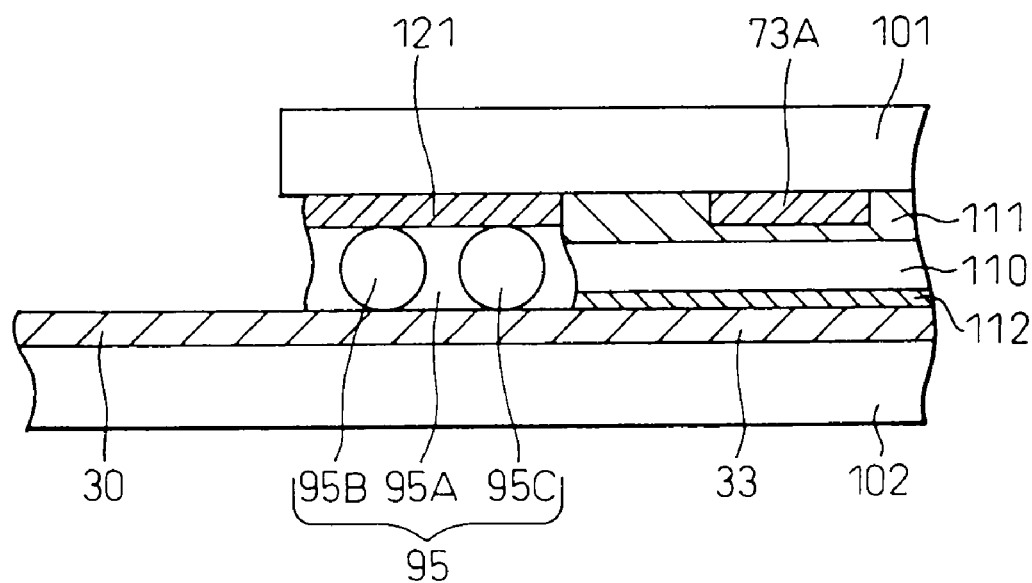
FIG. 2D is a cross-sectional view taken along line B–B' in FIG. 2B.

The details of the transfer structure are shown in FIGS. 2B to 2D. FIG. 2B, which shows a diagrammatic perspective view, and FIG. 2C, which shows a cross section of an essential portion, illustrate how the output routing wiring lines 72A for the COMIC 50, formed on the bottom glass substrate 102, are connected via the sealing member 95 to the COMIC output wiring lines 70A formed on the top glass substrate 101. The type of liquid crystal panel in which the wiring lines formed on the bottom glass substrate 102 are connected via the sealing portion to the wiring lines formed on the top glass substrate is called the transfer type liquid crystal panel.

On the other hand, the output routing wiring lines 30 for the SGDIC 10 are formed on the bottom glass substrate 102, and are extended as the wiring lines 33 into the pixel image area, thus forming the pixel electrodes, as previously described. In this case, as shown in FIGS. 2B and 2D, since no wiring lines are formed on the upper end of the sealing portion, a step is formed relative to the portion where the output routing wiring lines 70A for the COMIC 50 are formed, resulting in the formation of an uneven gap (partially even) between the top and bottom glass substrates; this can cause unevenness in the brightness of the displayed image. To prevent this, in the illustrated embodiment, a dummy electrode 121 is formed on the upper end of the sealing member 95 above the portion where the output routing wiring lines 30 for the SGDIC 10 are formed, thereby maintaining a uniform gap between the top and bottom glass substrates.

Next, the structure of the connection part between the bottom glass substrate 102 and the FPC 90 will be described.

As shown in FIG. 2A, the FPC 90 is connected by an anisotropic conductive adhesive 91 to the extended portion 102B of the bottom glass substrate 102. The anisotropic conductive adhesive 91 is a material similar to the sealing material 95 used in the transfer type panel earlier described, and is prepared by mixing conductive particles 91B and nonconductive particles 91C in an insulating adhesive material 91A. The nonconductive particles 91C serve to prevent the conductive particles 91B from connecting like a chain and shorting in directions parallel to the substrate. As a result, when the FPC 90 and the bottom glass substrate 102 are bonded with their wiring surfaces facing each other, the respective wiring lines formed on the FPC 90 and the substrate 102 are connected together by maintaining proper electrical connections between them.

Instead of the anisotropic conductive adhesive, connection by soldering, a conductive adhesive, or a connector may be employed, but nowadays, the anisotropic conductive adhesive is the dominant material because it requires fewer manufacturing steps and is easy to handle. The present invention is unaffected by the connection method, and any of the above-mentioned connection methods or materials may be used.

In the above embodiment of the present invention, the extended portion 102B is provided on one end of the bottom substrate, but it may be provided on the other end of the bottom substrate or on the top substrate; alternatively, extended portions may be provided on two or more ends.

Next, the structure of the mounting part for the COMIC 50 will be described. FIG. 2E is a plan view showing an essential portion of the FPC 90 on which the COMIC 50 is mounted, FIG. 2F is a plan view showing the arrangement of pads on the COMIC 50, and FIG. 2G is a plan view showing the structure of an anisotropic conducive sheet used to mount the COMIC 50 to the FPC 50.

In FIG. 2E, dashed line 51 indicates the mounting area for the COMIC 50. The FPC 90 is printed with the input wiring lines 60 and output wiring lines 71A, 71B for the COMIC 50 and the input wiring lines 20A for the SGDIC 10. The input wiring lines 20A for the SGDIC 10 are formed passing through the center of the mounting area 51 for the COMIC 50. The input wiring lines 60 for the COMIC 50 are formed with their ends clustered in the left and right corners of the mounting area 51, while the output wiring lines 71A and 71B are formed with their terminal ends clustered in the opposite left and right corners of the mounting area 51.

Figure 2F:
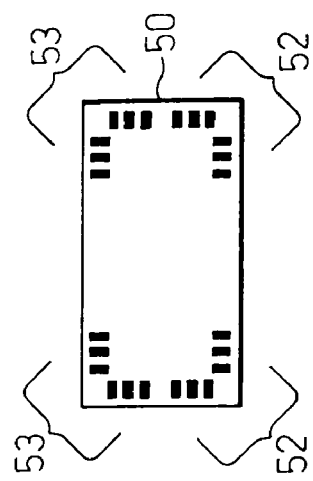
FIG. 2F is a plan view of a common electrode driver IC as viewed from the pad side of the IC chip, for revealing the structure in portion B in FIG. 2A.

The COMIC 50 is provided with connection pads 52 and 53 that are clustered in the four corners of the chip, as shown in FIG. 2F. When the chip is mounted on the mounting area 51 of the FPC 50, the input pads 52 are connected to the ends of the input wiring lines 60 via the anisotropic conductive sheet 93, and the output pads 53 are likewise connected to the ends of the output wiring lines 71A and 71B. The output wiring lines 71A and 71B from the COMIC 50 are connected to the routing wiring lines 72A and 72B via the anisotropic adhesive 91 at the connection part between the FPC 90 and the bottom glass substrate 102, as previously described. The number of wiring lines and the number of terminals shown in the diagrams are for illustrative purposes only, and are not limited to those shown here.

Figure 2G:
FIG. 2G is a plan view of an anisotropic conductive adhesive sheet, for revealing the structure in portion B in FIG. 2A.
Figure 2E:
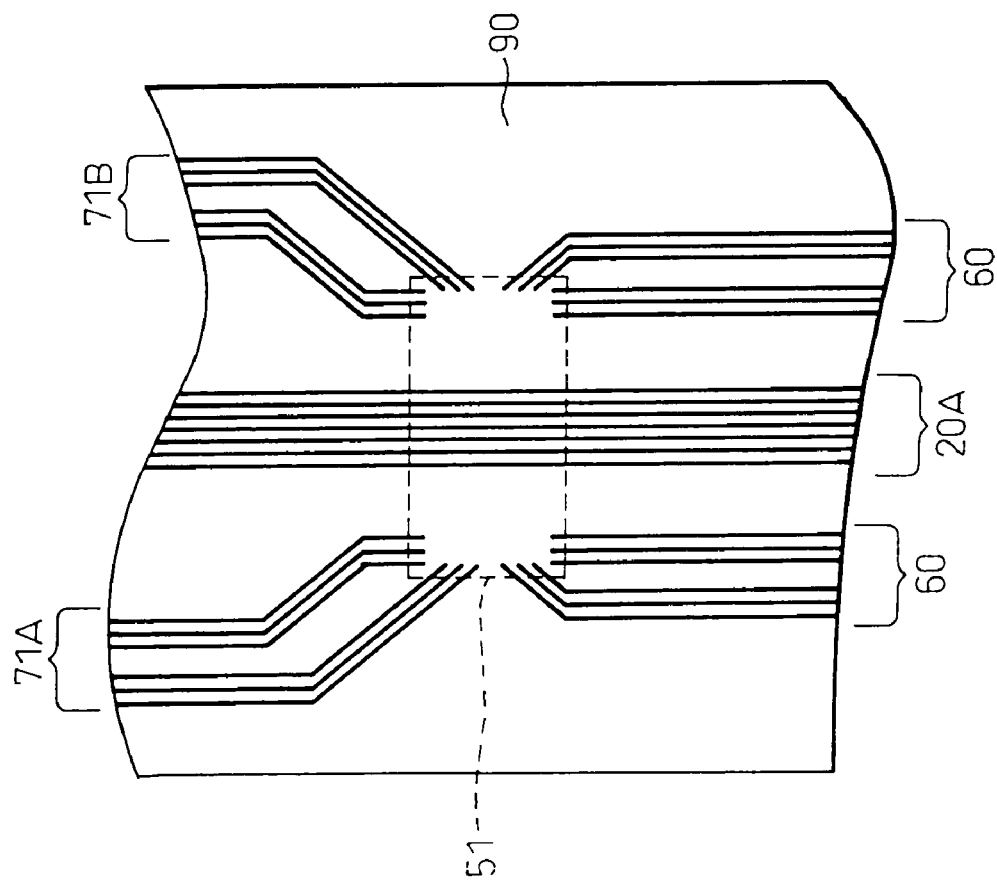
FIG. 2E is a plan view of an FPC with no IC mounted thereon, for revealing the structure in portion B in FIG. 2A.

The anisotropic conductive sheet 93 shown in FIG. 2G is formed from a material similar to the sealing material 95 or the anisotropic conductive adhesive 91, and is provided with electrical conductivity anisotropy by mixing conductive particles and nonconductive particles in an insulating adhesive material. Accordingly, by pressing the COMIC 50 onto the FPC 90 via the sheet 93, the IC chip is mounted to the FPC 90 with the pads 52 and 53 electrically connected to the respective wiring lines. Near the center of the COMIC 50, the nonconductive particles mixed in the sheet 93 act as spacers to maintain a prescribed gap between the COMIC 50 and the input wiring lines 20A for the SGDIC 50.

The method of mounting the COMIC 50 on the FPC 90 is not limited to the above mounting method; alternatively, the IC chip may be mounted by such means as soldering or a conductive adhesive.

The IC chip can also be mounted to the FPC by using a TCP (Tape Carrier Package), but in that case, since there is an opening directly below the IC chip, if wiring lines are passed under the IC, there arise problems such as breaks being caused in the lines and the number of wiring lines cannot be increased; in the present invention, therefore, it is preferable to mount the chip to the FPC that does not have such problems.

On the other hand, the SGDIC is mounted on the extended portion 102B of the bottom glass substrate 102 of the liquid crystal panel 100; for example, the SGDIC can be mounted by connecting the electrodes to the IC connection terminals (not shown) formed on the extended portion 102B, by soldering or by means of a conductive adhesive or an anisotropic conductive adhesive. This mounting method is known as COG mounting.

The TCP used to mount the COMIC to the FPC 90 as previously described can also be placed in the COG mounting area. The effect of the invention can also be achieved by connecting a TCP to the liquid crystal panel 100 in the same manner that the FPC 90 is connected to the liquid crystal panel 100, and by mounting another TCP on the liquid crystal panel 100 in the same manner that the SGDIC is mounted on the extended portion 102B of the bottom glass substrate 102 of the liquid crystal panel 100.

The IC chip mounted on the bottom glass substrate is covered with the resin material 130 for protection from moisture and damage.

Instead of mounting the IC chip directly on the extended portion 102B, the driver IC may be mounted on the above-described TPC, and this TCP may be mounted on the extended portion of the glass substrate.

All the input wiring lines 20A for the SGDIC need not be passed under the COMIC 50, but if the FPC 90 is provided with a through-hole or a two-layer wiring structure, the cost of the FPC 90 increases, which is not desirable from the viewpoint of cost effectiveness. It is therefore preferable that all the input wiring lines 20A for the SGDIC 10 be passed under the COMIC 50 if at all possible.

It is also possible to reduce the number of SGDIC input wiring lines passing under the COMIC 50 by providing a power supply line common to the COMIC 50 and the SGDIC 10 and by also making use of wiring lines within the IC or terminals on the IC; this further enhances the effect of the present invention to reduce the size of the device construction, and improves the IC mounting reliability.

The COMIC output wiring lines 71A and 71B are passed through the connection part between the FPC 90 and the bottom glass substrate 102 and routed into the liquid crystal panel 100, thus forming the COM electrodes 73A and 73B in the pixel section. At this time, the wiring lines 72A and 72B are arranged in such a manner as to flank the SGDIC 10 and the wiring lines for the SGDIC 10, as shown in FIG. 1.

This structure serves to reduce the size of the extended portion 102B, and by bending the FPC 90, the size of the image device can be further reduced.

The structure also offers a cost advantage, since the size can be reduced without integrating the SGDIC 10 and the COMIC 50 into a single chip.

Further, when a driving method is used that applies a high voltage to the COMIC 50 and a low voltage to the SGDIC 10, since the COMIC 50, having a higher risk of breakdown due to the high voltage, is mounted on the FPC 90, the IC, if broken, can be easily replaced, which is advantageous in terms of cost.

Figure 3:
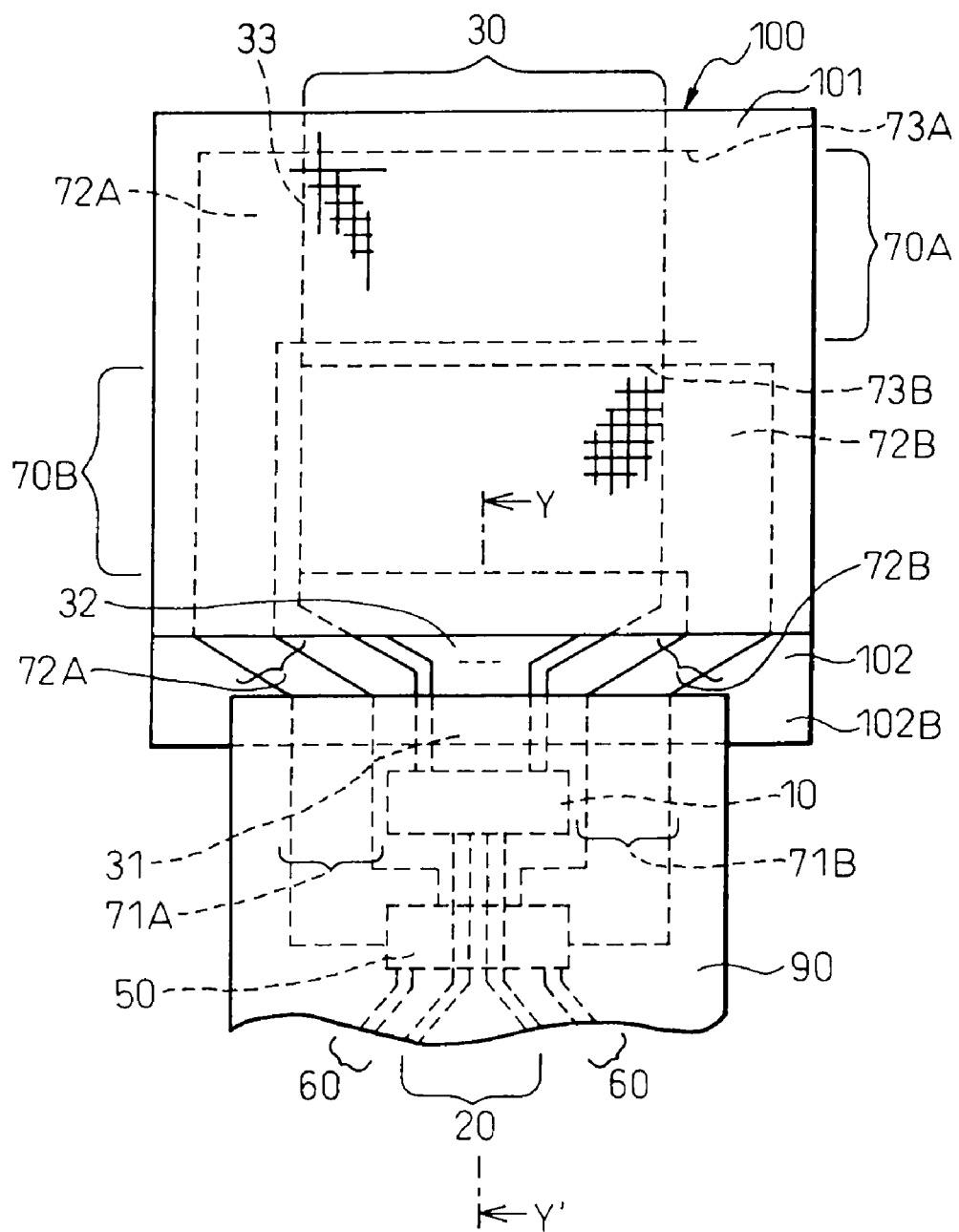
FIG. 3 is a plan view showing an essential portion of an image device according to a second embodiment of the present invention.

A second embodiment of the present invention will be described with reference to FIGS. 3 and 4. In the second embodiment, the SGDIC 10 and the COMIC 50 are both mounted on the FPC 90, and the COG mounting employed in the first embodiment is not implemented here. FIG. 3 also depicts the wiring for the pixel section in detail which was not shown in FIG. 1.

Figure 4:
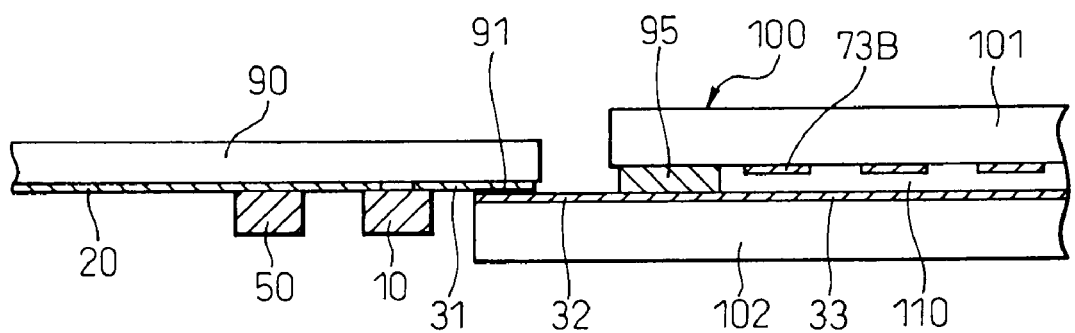
FIG. 4 is a cross-sectional view taken along line Y–Y' in FIG. 3.

In addition to the feature that not only the COMIC 50 but also the SGDIC 10 is mounted on the FPC 90 as shown in FIGS. 3 and 4, the embodiment has the following feature.

The input wiring lines 60 for the COMIC 50 and the input wiring lines 20 for the SGDIC 10 are formed on the FPC 90. The input wiring lines 60 for the COMIC 50 are directly connected to the input terminals of the COMIC 50 mounted on the FPC 90.

The input wiring lines 20 for the SGDIC 10 are passed under the COMIC 50 mounted on the FPC 90, and connected to the input terminals of the SGDIC 10 mounted on the FPC 90.

The output wiring lines from the COMIC 50 are split between the output wiring lines 71A for the COMIC 50 passing in the left-hand part in FIG. 3 and the output wiring lines 71B for the COMIC 50 passing in the right-hand part in FIG. 3, and the output wiring lines 71A and 71B are then passed through the anisotropic conductive adhesive 91, i.e., the connection part between the FPC 90 and the bottom glass substrate 102, and routed as the COMIC output routing lines 72A and 72B in the liquid crystal panel 100, forming the COM electrodes 73A and 73B in the pixel section.

With the above wiring, the COM electrodes 73A are arranged as one block in the upper part in FIG. 3 and the COM electrodes 73B are arranged as one block in the lower part, the two blocks thus forming the entire array of COM electrodes.

Whether the COM electrodes are arranged into two blocks or not should be determined by determining the optimum value as the specification based on the size and shape of the liquid crystal panel, the number of electrodes, and the electrode density. Of course, the entire array of COM electrodes may be configured as one block.

On the other hand, the wiring lines for the SGDIC 10 are first passed under the COMIC 50 and then connected to the input terminals of the SGDIC 10 mounted on the FPC 90.

The output wiring lines from the SGDIC 10 are routed within the FPC 90 as the output routing lines 31 for the SGDIC 10, and the output routing lines 31 are then passed through the anisotropic conductive adhesive 91, i.e., the connection part between the FPC 90 and the bottom glass substrate 102, and routed as the SGDIC output routing lines 32 in the liquid crystal panel 100, forming the SGD electrodes 33 in the pixel section.

This structure serves to reduce the size of the extended portion 102B; further, by bending the FPC 90, the size of the image device can be greatly reduced.

The structure also offers a cost advantage, since the size can be reduced without integrating the SGDIC and the COMIC into a single chip.

Furthermore, since the SGDIC 10 and the COMIC 50 are both mounted on the FPC 90, the ICs, if broken, can be easily replaced, which is advantageous in terms of cost.

A third embodiment of the present invention will be described with reference to FIGS. 5 and 6. In the third embodiment, as in the second embodiment, the SGDIC 10 and the COMIC 50 are both mounted on the FPC 90, and the COG mounting employed in the first embodiment is not implemented here. The third embodiment differs from the second embodiment in the wiring for the pixel section. Therefore, the third embodiment will be described focusing on differences from the second embodiment shown in FIGS. 3 and 4.

The input wiring lines 60 for the COMIC 50 and the input wiring lines 20 for the SGDIC 10 are formed on the FPC 90. The input wiring lines 60 for the COMIC 50 are directly connected to the input terminals of the COMIC 50 mounted on the FPC 90.

The input wiring lines 20 for the SGDIC 10 are passed under the COMIC 50 mounted on the FPC 90, and connected to the input terminals of the SGDIC 10 mounted on the FPC 90.

Figure 5:
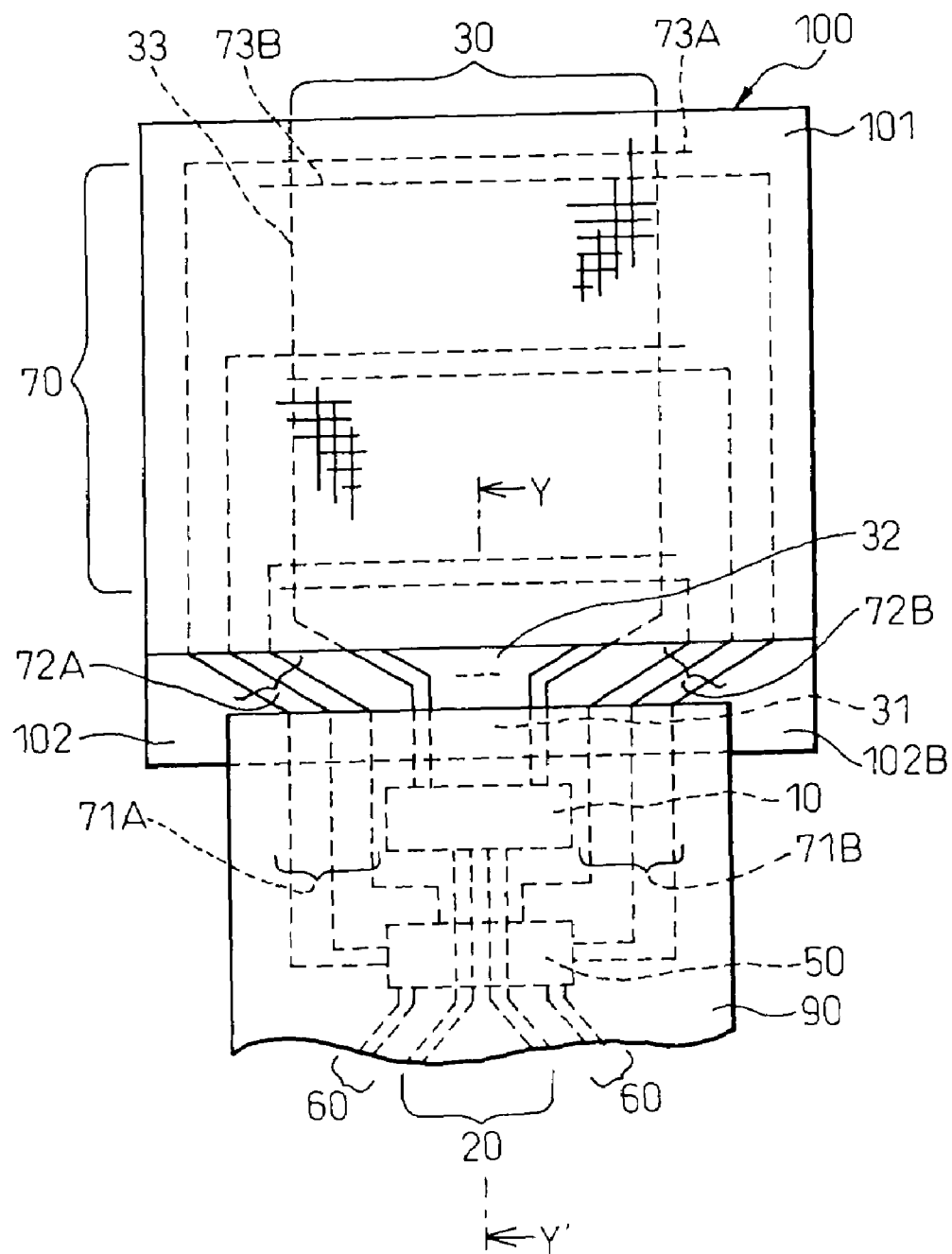
FIG. 5 is a plan view showing an essential portion of an image device according to a third embodiment of the present invention.
Figure 6:
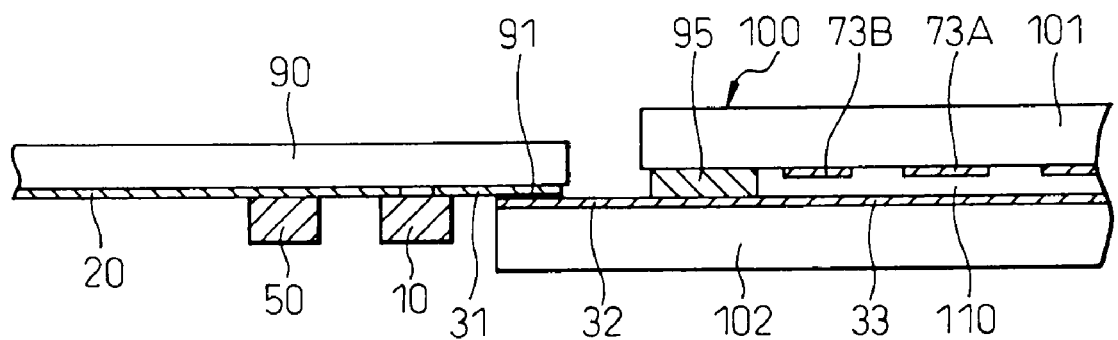
FIG. 6 is a cross-sectional view taken along line Y–Y' in FIG. 5.

The output wiring lines 70 from the COMIC 50 are split between the output wiring lines 71A for the COMIC 50 passing in the left-hand part in FIG. 5 and the output wiring lines 71B for the COMIC 50 passing in the right-hand part in FIG. 5, and the output wiring lines 71A and 71B, after being routed within the FPC 90, are passed through the anisotropic conductive adhesive 91, i.e., the connection part between the FPC 90 and the bottom glass substrate 102, and routed as the COMIC output routing lines 72A and 72B in the liquid crystal panel 100, forming the COM electrodes 73A and 73B which form pixels.

With the above wiring, one COM electrode 73A is arranged in the uppermost row in FIG. 5, then one COM electrode 73B is arranged in the next row; by repeating this pattern, the COM electrodes 73A and the COM electrodes 73B are arranged alternately, first from the left-side wiring, then from the right-side wiring, and so on, as shown in the figure.

In the third embodiment, the electrodes are arranged with one wiring line from the left-side wiring alternating with one wiring line from the right-side wiring, but they may be arranged in such a manner that a group of n wiring lines, for example, two or three wiring lines, from the left-side wiring alternates with a group of n wiring lines, for example, two or three wiring lines, from the right-side wiring; in this case, the value of n can be determined appropriately according to the specification of the liquid crystal panel.

This structure serves to reduce the size of the extended portion 102B; further, by bending the FPC 90, the size of the image device can be greatly reduced.

The structure also offers a cost advantage, since the size can be reduced without integrating the SGDIC 10 and the COMIC 50 into a single chip.

Furthermore, since the SGDIC 10 and the COMIC 50 are both mounted on the FPC 90, the ICs, if broken, can be easily replaced, which is advantageous in terms of cost.

In the second embodiment, brightness unevenness may occur at the boundary between the blocks, mainly due to the difference in wiring resistance. The third embodiment has the effect of being able to eliminate such brightness unevenness between the blocks.

A fourth embodiment of the present invention will be described with reference to FIGS. 7 and 8.

While, in the second embodiment, the SGDIC 10 and the COMIC 50 are both mounted on the FPC 90, in the fourth embodiment the SGDIC 10 and the COMIC 50 are both mounted on the liquid crystal panel 100.

Figure 7:
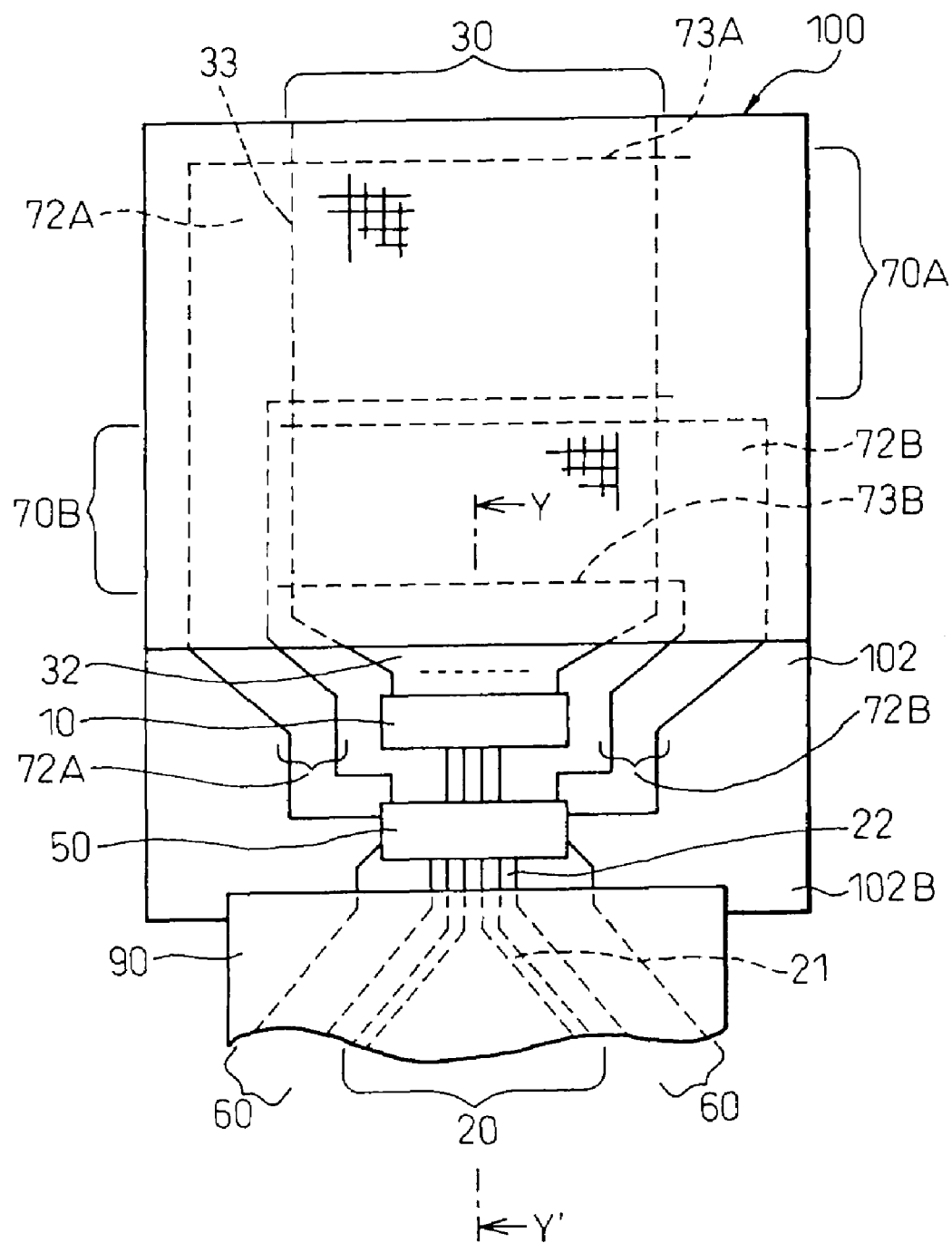
FIG. 7 is a plan view showing an essential portion of an image device according to a fourth embodiment of the present invention.
Figure 8:
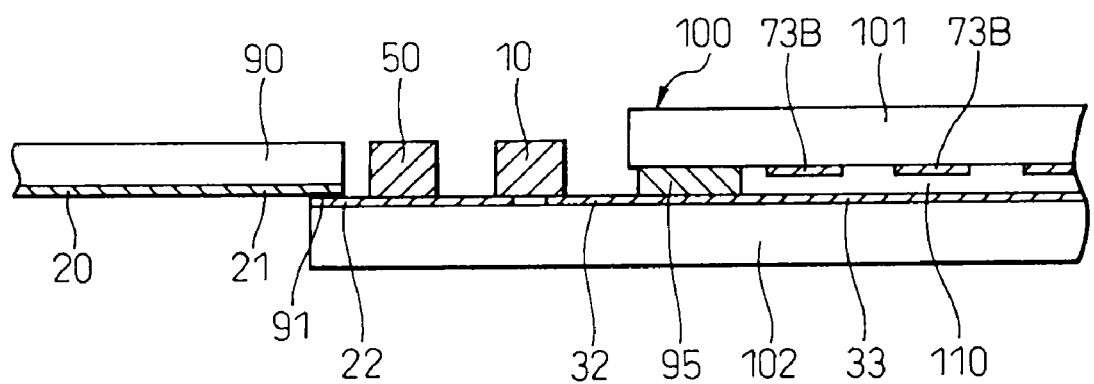
FIG. 8 is a cross-sectional view taken along line Y–Y' in FIG. 7.
Figure 11A:
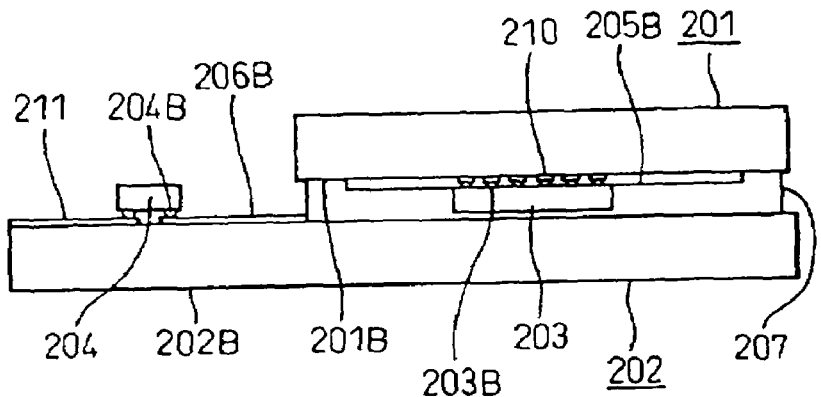
FIG. 11A is a front view of an image device according to first prior art related to the present invention.
Figure 11B:
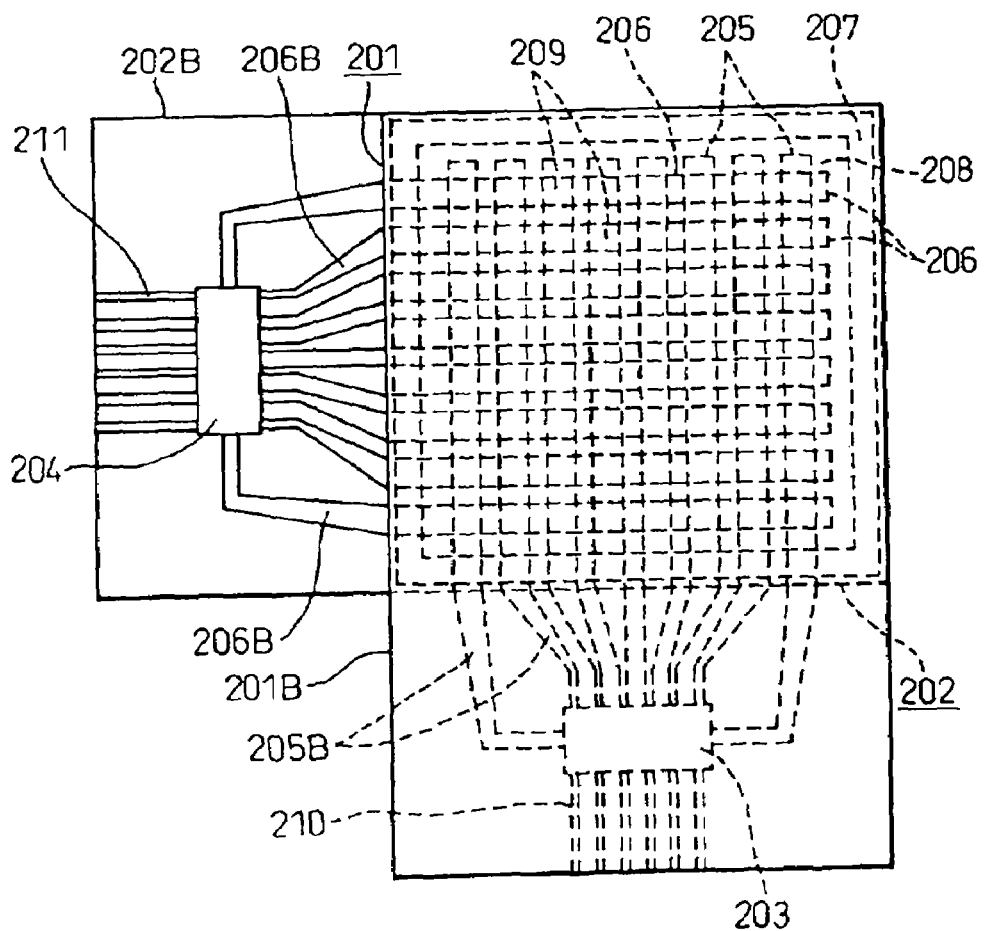
FIG. 11B is a top plan view of the image device shown in FIG. 11A.
Figure 12A:
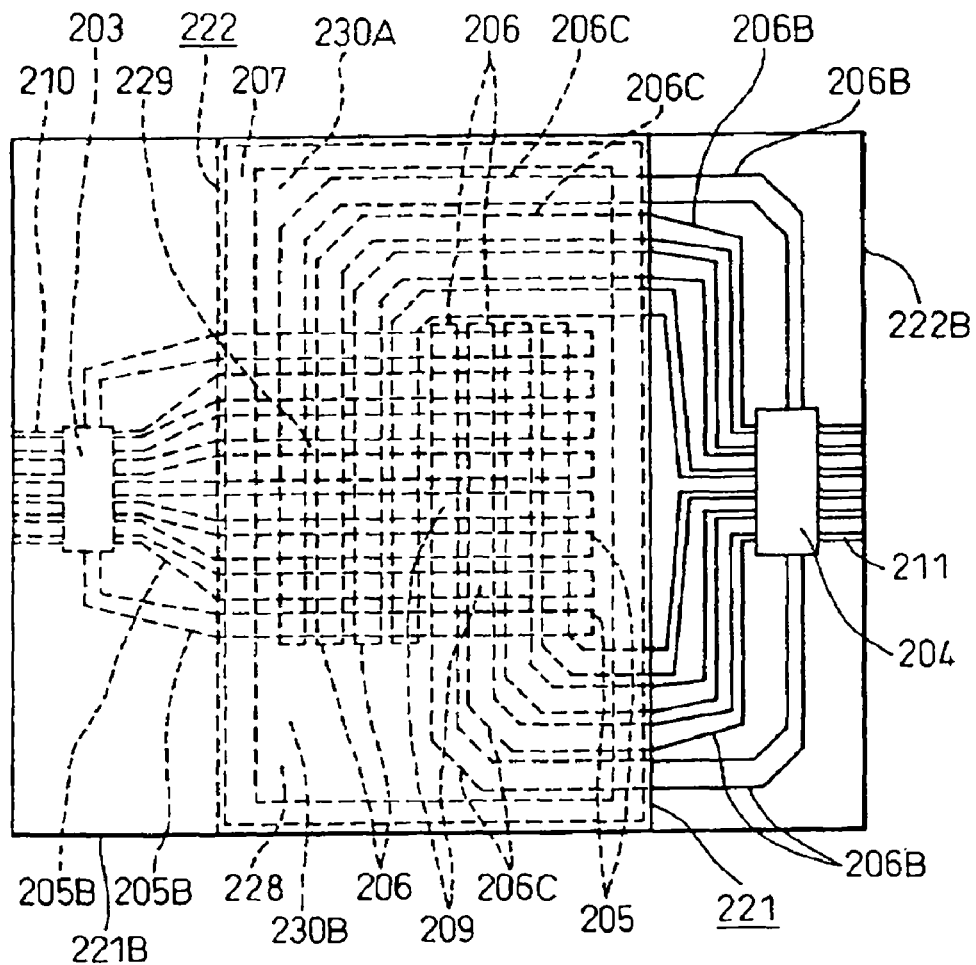
FIG. 12A is a top plan view of an image device according to second prior art related to the present invention.
Figure 12B:
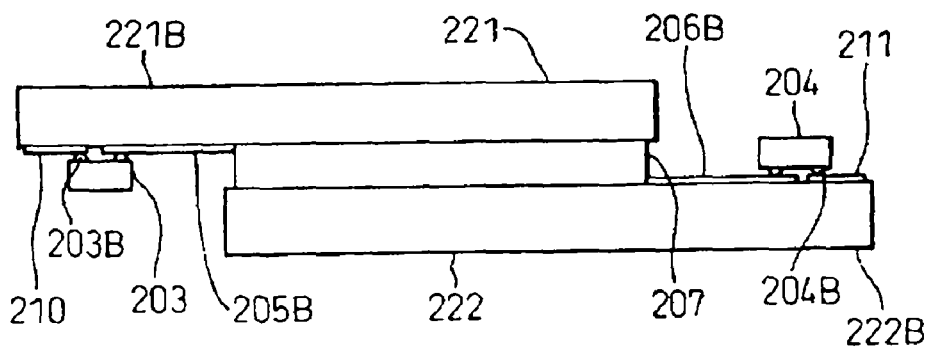
FIG. 12B is a front view of the image device shown in FIG. 11A.
Figure 13:
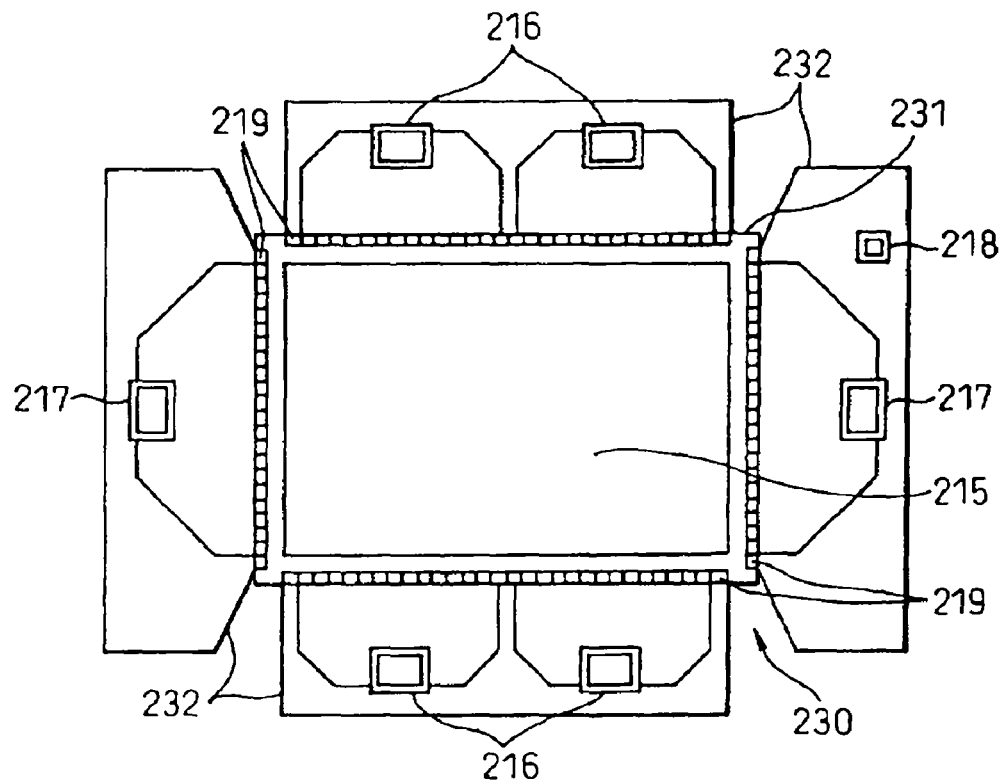
FIG. 13 is a top plan view showing an essential portion of an image device according to third prior art related to the present invention.
Figure 14:
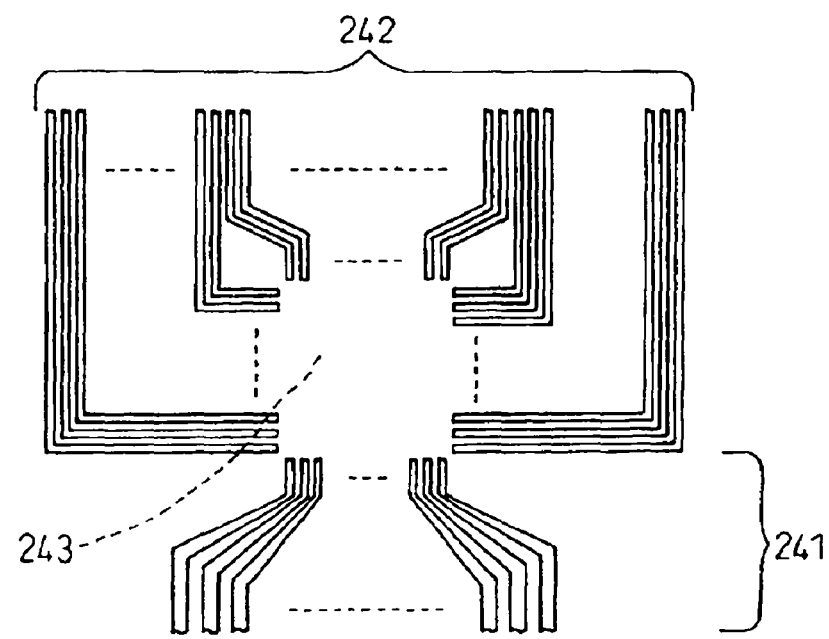
FIG. 14 is a diagram showing a wiring pattern on a substrate in an image device according to fourth prior art related to the present invention.

In addition to the feature that not only the SGDIC 10 but also the COMIC 50 is mounted on the liquid crystal panel 100 as shown in FIGS. 7 and 8, the embodiment has the following feature.

The input wiring lines 60 for the COMIC 50 and the input wiring lines 20 for the SGDIC 10 are formed on the FPC 90 and, after being routed within the FPC 90, the input wiring lines are connected into the liquid crystal panel 100 via the anisotropic conductive adhesive 91, i.e., the connection part between the FPC 90 and the bottom glass substrate 102.

The input wiring lines 60 for the COMIC 50 are routed into the liquid crystal panel 100 via the anisotropic conductive adhesive 91, i.e., the connection part between the FPC 90 and the bottom glass substrate 102, and connected to the input terminals of the COMIC 50 mounted on the extended portion 102B.

On the other hand, the input wiring lines 20 for the SGDIC 10 are routed into the liquid crystal panel 100 via the anisotropic conductive adhesive 91, i.e., the connection part between the FPC 90 and the bottom glass substrate 102, and then routed as the input wiring lines 22 for the SGDIC 10 on the extended portion 102B; the input wiring lines 22 are passed under the COMIC 50 mounted on the extended portion 102B, and connected to the input terminals of the SGDIC 10 mounted on the extended portion 102B.

The output wiring lines 72A and 72B from the COMIC 50 are routed separately as the COMIC output wiring lines 70A passing in the left-hand part in FIG. 7 and the COMIC output wiring lines 70B passing in the right-hand part in FIG. 7 and, after being routed within the liquid crystal panel 100 as the output routing lines 72A and 72B for the COMIC 50, are connected to the COM electrodes 73A and 73B which form pixels.

With the above wiring, the COM electrodes 73A are arranged as one block in the upper part in FIG. 7 and the COM electrodes 73B are arranged as one block in the lower part in FIG. 7, the two blocks thus forming the entire array of COM electrodes.

Whether the COM electrodes are arranged into two blocks or not should be determined by determining the optimum value as the specification based on the size and shape of the liquid crystal panel, the number of electrodes, and the electrode density. Of course, the entire array of COM electrodes may be configured as one block.

On the other hand, the wiring lines for the SGDIC 10 are first passed under the COMIC 50 and then connected to the input terminals of the SGDIC 10 mounted on the extended portion 102B.

The output wiring lines 30 from the SGDIC are routed within the liquid crystal panel 100 as the SGDIC output routing lines 32, and form the SGD electrodes 33 in the pixel section.

In the above structure, while the extended portion 102B becomes larger than that of the second embodiment, there is no need to handle FPCs with integrated circuits (ICs) mounted thereon but it is only necessary to handle the liquid crystal panel (an FPC with no ICs mounted thereon may be attached to it), offering the advantage of easy handling and low manufacturing cost.

Furthermore, since the output wiring lines 30 from the SGDIC 10 are not routed via the FPC 90, the above structure is suited to the construction where the number of output wiring lines 30 for the SGDIC 10 is large.

Another advantage is that the thickness of the image device can be further reduced by holding the thickness of the ICs to within the thickness of the top glass substrate 101.

The structure also offers a cost advantage, since the size can be reduced without integrating the SGDIC 10 and the COMIC 50 into a single chip.

Furthermore, since the SGDIC 10 and the COMIC 50 are both mounted on the extended portion 102B of the liquid crystal panel 100, the structure has the advantage of being able to reduce the cost because the mounting of the SGDIC 10 and the mounting of the COMIC 50 can be accomplished in a single mounting step.

In the first to fourth embodiments described above, the input wiring lines for the SGDIC 10 are passed under the COMIC 50, but the present invention can also be carried out and the same effect obtained in other ways. FIGS. 4, 6, and 8 given above are diagrams showing the cross-sectional structure of the essential portion of the panel.

A fifth embodiment of the present invention will be described with reference to FIG. 9.

In the foregoing fourth embodiment, the input wiring lines 22 for the SGDIC 10 are passed under the COMIC 50 and connected to the input terminals of the SGDIC 10; in contrast, in the fifth embodiment, the output wiring lines 30 from the SGDIC 10 are passed under the COMIC 50 and thereafter connected to the SGD electrodes 33.

In addition to the feature that not only the SGDIC 10 but also the COMIC 50 is mounted on the liquid crystal panel 100 as shown in FIG. 9, the embodiment has the following feature.

The input wiring lines 60 for the COMIC 50 and the input wiring lines 20 for the SGDIC 10 are formed on the FPC 90 and, after being routed within the FPC 90, the input wiring lines are connected into the liquid crystal panel 100 via the anisotropic conductive adhesive 91, i.e., the connection part between the FPC 90 and the bottom glass substrate 102.

The input wiring lines 60 for the COMIC 50 are routed into the liquid crystal panel 100 via the anisotropic conductive adhesive 91, i.e., the connection part between the FPC 90 and the bottom glass substrate 102, and connected to the input terminals of the COMIC 50 mounted on the extended portion 102B.

On the other hand, the wiring lines 21 on the FPC 90, which constitute the input wiring lines 20 for the SGDIC 10, are routed into the liquid crystal panel 100 via the anisotropic conductive adhesive 91, i.e., the connection part between the FPC 90 and the bottom glass substrate 102, and then routed as the input wiring lines 22 for the SGDIC 10 on the extended portion 102B and connected to the input terminals of the SGDIC 10 mounted on the extended portion 102B.

The output wiring lines 70A and 70B from the COMIC 50 are routed separately as the COMIC output wiring lines 70A passing in the left-hand part in FIG. 9 and the COMIC output wiring lines 70B passing in the right-hand part in FIG. 9 and, after being routed within the liquid crystal panel 100 as the output routing lines 72A and 72B for the COMIC 50, are connected to the COM electrodes 73A and 73B which form pixels.

With the above wiring, the COM electrodes 73A are arranged as one block in the upper part in FIG. 7 and the COM electrodes 73B are arranged as one block in the lower part in FIG. 7, the two blocks thus forming the entire array of COM electrodes.

Whether the COM electrodes are arranged into two blocks or not should be determined by determining the optimum value as the specification based on the size and shape of the liquid crystal panel, the number of electrodes, and the electrode density. Of course, the entire array of COM electrodes may be configured as one block.

On the other hand, the output wiring lines 30 from the SGDIC 10 are passed under the COMIC 50 mounted on the extended portion 102B and, after being routed within the liquid crystal panel 100 as the output routing lines 32 for the SGDIC 10, are connected to the SGD electrodes which form pixels.

In the above structure, while the extended portion 102B becomes larger than that of the second embodiment, there is no need to handle FPCs with integrated circuits (ICs) mounted thereon but it is only necessary to handle the liquid crystal panel (though an FPC with no ICs mounted thereon is attached to it), offering the advantage of easy handling.

Furthermore, since the output wiring lines 30 from the SGDIC 10 are not routed via the FPC 90, the above structure is suited to the construction where the number of output wiring lines 30 for the SGDIC 10 is large.

Another advantage is that the thickness of the image device can be further reduced by holding the thickness of the ICs to within the thickness of the top glass substrate 101.

The structure also offers a cost advantage, since the size can be reduced without integrating the SGDIC 10 and the COMIC 50 into a single chip.

Furthermore, since the SGDIC 10 and the COMIC 50 are both mounted on the extended portion 102B of the liquid crystal panel 100, the structure has the advantage of being able to reduce the cost because the mounting of the SGDIC 10 and the mounting of the COMIC 50 can be accomplished in a single mounting step.

Whether to use the fourth embodiment or the fifth embodiment is determined appropriately according to the number of terminals on the SGDIC 10 and COMIC 50, the number of terminals in the vertical and horizontal directions of the liquid crystal panel, the electrode width, the aspect ratio of the pixel section, etc.

FIG. 10 is a diagram showing the wiring lines in the IC mounting area for explaining the wiring pattern in the area on the bottom glass substrate where the electrode driver ICs are mounted as illustrated in FIG. 9 that showed a plan view of the structure of the fifth embodiment.

The wiring pattern shown in FIG. 10 is not specifically limited to the embodiment of FIG. 9, but is also applicable to any of the first to fourth embodiments.

A description will be given with reference to FIG. 10 while also referring to FIG. 9 as needed.

In FIG. 10, dashed line 55 shows the position where the COMIC 50 is mounted, while dashed line 11 shows the position where the SGDIC 10 is mounted. The input wiring lines 60 for the COMIC 50 are routed into the liquid crystal panel 100 via the anisotropic conductive adhesive 91, i.e., the connection part between the FPC 90 and the bottom glass substrate 102, and connected to the COMIC 50 mounted on the extended portion 102B.

On the other hand, the input wiring lines 20 for the SGDIC 10 are connected to the input terminals of the SGDIC 10 mounted on the extended portion 102B.

The output routing wiring lines 72A and 72B from the COMIC 50, whose ends are connected to the output terminals of the COMIC 50, are routed through the liquid crystal panel 110 and connected to the COM electrodes 73A and 73B which form pixels as shown in FIG. 9.

The output routing wiring lines 32 from the output terminals of the SGDIC 10 are passed under the COMIC 50 mounted on the extended portion 102B, and are routed through the liquid crystal panel 100 and connected to the SGD electrodes 33 which form pixels.

In FIG. 10, the input/output terminals of the COMIC are clustered in the four corners of the COMIC so that a larger number of wiring lines from the SGDIC 10 can be passed under the COMIC. This feature has the effect of further reducing the size of the image device. On the other hand, the number of wiring lines passing under the COMIC can be reduced to increase the spacing between the wiring lines and thereby prevent shorting, etc. and enhance the reliability.

Furthermore, by inserting a gap adjusting spacer between the IC and the substrate, the wiring lines passing under the IC can be prevented from being damaged and disconnected by the overlying IC.

As the spacer to be mounted on the liquid crystal panel, use can be made, for example, of a color filter, an insulating film, an alignment film, a light blocking film, a reflective film, or a sealing member; since this can eliminate the step of attaching the spacer, the structure offers the advantage of being able to achieve a cost reduction and an improvement in reliability.

If the mounting adhesive used to mount the IC is also used as the spacer material by mixing therein nonconductive particles having a suitable particle size, anisotropic conductive adhesion with a constant thickness or gap can be accomplished. This not only achieves reliable mounting but can also reduce the number of manufacturing steps.

It is also possible to prevent shorting between the routing wiring lines 32 and the COMIC 50 by covering the routing wiring lines 32 passing under the COMIC 50 with an insulating film. Alternatively, the surface of the COMIC 50, excluding its terminal portions (for example, the pads 52 in FIG. 2F), may be covered with an insulating film. Further, the insulating film may be formed not only on the surface of the IC but also on the wiring lines.

In FIG. 2F, the input/output terminals of the COMIC are clustered in the four corners of the IC chip, that is, no input/output terminals are formed in the center portions of the longer sides of the COMIC. Accordingly, wiring lines for the SGDIC 10 may be formed in these portions. In that case, the output wiring lines from the SGDIC 10 can be routed to the panel via the wiring lines formed on the COMIC. This structure serves to prevent shorting between the IC and the wiring lines passing under the IC and thereby improve not only the reliability of the mounting but also the reliability of the image device.

In the above embodiments, the SGDIC has been shown as incorporating the segment electrode driving circuit, but in addition to that, a memory circuit and a control circuit may also be incorporated into the SGDIC.

Likewise, in the above embodiments, the COMIC has been shown as incorporating the common electrode driving circuit, but in addition to that, a memory circuit and a control circuit may also be incorporated into the COMIC.

Preferably, circuits requiring a high operating voltage should be incorporated in the COMIC and lower voltage circuits in the SGDIC.

ADVANTAGEOUS EFFECT OF THE INVENTION

As described above with reference to the preferred embodiments, in the image device of the present invention, the integrated circuits for driving the panel are arranged substantially parallel to each other on one side of the panel. Accordingly, the external connection board for supplying external signals to these integrated circuits need only be connected to the one side of the panel. As a result, the top plan dimensions of the image device of the invention become substantially smaller compared with the prior art device, greatly contributing to reducing the cost and the size of the entire construction.

What is claimed is:

1. A display device comprising:
    a panel having a display area in which first electrodes and second electrodes are disposed in matrix form;
    a first integrated circuit for driving said first electrodes;
    a second integrated circuit for driving said second electrodes; and
    input wiring lines for said first and second integrated circuits; wherein
    in a direction from an end of the panel towards said display area, said first integrated circuit is disposed nearer to said display area than said second integrated circuit and said second integrated circuit is disposed farther from said display area than said first integrated circuit; and
    said input wiring lines for said first integrated circuit are passed under said second integrated circuit.

2. A display device as claimed in claim 1, wherein said output wiring lines from said second integrated circuit mounted farther from said display area are routed to said display area by being passed under said first integrated circuit mounted nearer to said display area.

3. A display device as claimed in claim 1, wherein said first and second integrated circuits are arranged one behind the other along a direction directed from an end of the panel toward said display area, and at least a part of said first integrated circuit is positioned on an extension of the panel.

4. A display device as claimed in claim 3, wherein said input wiring lines for said first integrated circuit mounted nearer to said display area are passed under said second integrated circuit mounted father from said display area, and are then connected to said first integrated circuit mounted nearer to said display area.

5. A display device as claimed in claim 1 or 4, wherein connection terminals on said second integrated circuit under which said input wiring lines are passed are formed near four corners of said second integrated circuit.

6. A display device as claimed in claim 2 or 1, wherein said panel includes opposed substrates, one substrate has an extended portion extending from one end thereof and protruding beyond a corresponding end of the other substrate, and said panel and said external connection board are connected together at said extended portion with their wiring surfaces facing each other.

7. A display device as claimed in claim 6, wherein at least one of said first and second integrated circuits is mounted on said extended portion.

8. A display device as claimed in claim 6, wherein at least one of said first and second integrated circuits is mounted on said external connection board.

9. A display device comprising:
    a panel having a display area in which first electrodes and second electrodes are disposed in matrix form;

an external connection board connected to said panel;
a first integrated circuit for driving said first electrodes;
a second integrated circuit for driving said second electrodes; and
input wiring lines for said first and second integrated circuits;
wherein, in a direction from said external connection board towards said display area, said first integrated circuit is disposed nearer to said display area than said second integrated circuit and said second integrated circuit is disposed farther from said display area than said first integrated circuit; and
said output wiring lines from said second integrated circuit mounted farther from said display area are routed to said display area by being passed under said first integrated circuit mounted nearer to said display area.

10. A display device as claimed in any one of claims 2, 1, 3, 4, and 9, wherein said panel is constructed by arranging a segment electrode and a common electrode opposite each other between two substrates.

11. A display device as claimed in claim 10, wherein one of said first and second integrated circuits is a segment electrode driving integrated circuit for driving said segment electrode, and
the other is a common electrode driving integrated circuit for driving said common electrode.

12. A display device as claimed in claim 10, wherein said first integrated circuit mounted nearer to said display area is the segment electrode driving integrated circuit.

13. A display device comprising:
a panel having a display area in which first electrodes and second electrodes are disposed in a matrix form;
an external connection board connected to said panel;
a first integrated circuit for driving said first electrodes;
a second integrated circuit for driving said second electrodes; and
input wiring lines for said first and second integrated circuits,
wherein said panel includes two substrates facing each other, one of the two substrates having an extended portion extending from one end thereof and protruding beyond a corresponding end of the other substrate, said panel and said external connection board being connected together at said extended portion with their wiring surfaces facing each other, said first integrated circuit being mounted on said extended portion, and said second integrated circuit being mounted on said external connection board; and
wherein said input wiring lines of said first integrated circuit, which is disposed nearer to said panel than said second integrated circuit are connected to said first integrated circuit by passing under a surface of said second integrated circuit, said surface facing to said external connection board.

14. A display device as claimed in claim 13, wherein said first integrated circuit is a segment electrode driving integrated circuit.

* * * * *